United States Patent
Gray et al.

(10) Patent No.: US 6,542,802 B2
(45) Date of Patent: Apr. 1, 2003

(54) VEHICLE OCCUPANT CHARACTERIZATION METHOD WITH ROUGH ROAD COMPENSATION

(75) Inventors: Charles A. Gray, Noblesville, IN (US); Royce L. Rennaker, Converse, IN (US); Phillip E Kaltenbacher, II, Kokomo, IN (US); Chance Lee Scales, Kokomo, IN (US); Duane D. Fortune, Lebanon, IN (US); Morgan D. Murphy, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/895,742

(22) Filed: Jul. 2, 2001

(65) Prior Publication Data

US 2003/0004628 A1 Jan. 2, 2003

(51) Int. Cl.$^7$ .................................................. G06F 7/00
(52) U.S. Cl. .............................. 701/45; 701/46; 701/47; 280/728.1; 280/734; 280/735
(58) Field of Search ............................... 701/45, 46, 47; 280/728.1, 734, 735; 180/268

(56) References Cited

U.S. PATENT DOCUMENTS 6,246,936 B1 * 6/2001 Murphy et al. ............... 701/45
6,397,136 B1 * 5/2002 Breed et al. .................. 701/45

* cited by examiner

Primary Examiner—Yonel Beaulieu
(74) Attorney, Agent, or Firm—Robert M. Sigler

(57) ABSTRACT

An improved weight-based occupant characterization method reliably distinguishes between a child or small adult and a tightly cinched child seat based on a variance in the sensed occupant weight and a variance in the vehicle acceleration. The weight variance and acceleration variance are used to determine a relative or normalized variance that compensates for the effects of operating the vehicle on a rough road surface. The occupant is characterized as a child seat if the normalized variance is below a first threshold for a predetermined interval, and as a child or small adult if the normalized variation exceeds a second threshold for a predetermined interval.

8 Claims, 4 Drawing Sheets

VEHICLE OCCUPANT CHARACTERIZATION METHOD WITH ROUGH ROAD COMPENSATION

TECHNICAL FIELD

This invention relates to a method of characterizing the occupant of a motor vehicle for purposes of enabling or disabling air bag deployment based on sensed occupant weight, and more particularly to a method of distinguishing a cinched child seat from a small adult or child of similar apparent weight.

BACKGROUND OF THE INVENTION

Vehicle occupant weight detection systems are useful in connection with air bags and other pyrotechnically deployed restraints as a means of characterizing the occupant for purposes of determining whether to enable or disable deployment of the restraints. For example, it is generally desired to enable deployment for a child or small adult, and to disable deployment (or reduce deployment force) for a small child. In the case of infant or child seats (referred to herein collectively as child seats) that are placed on the vehicle seat and cinched down with a seat belt, it is generally believed that deployment should be disabled entirely. Unfortunately, there can be some ambiguity in the case of a child seat, particularly if the seat belt restraining the child seat is cinched very tightly, as a tightly cinched child seat can produce a weight reading similar to that of a small adult ($5^{th}$ percentile female). Accordingly, various attempts have been made to distinguish a child seat from other occupants producing a similar weight reading. In certain systems, for example, a special tag is affixed to the child seat for detection by a sensor located in the seat back or instrument panel. It has also been proposed to measure the seat belt restraining force to determine if a significant portion of the sensed weight is due to a cinched seat belt. However, both of these approaches are difficult to implement in an inexpensive and reliable manner.

A cost-effective and generally reliable method of distinguishing between a small adult and a tightly cinched child seat is disclosed in co-pending and co-assigned U.S. patent application Ser. No. 09/412,936, filed on Oct. 5, 1999. According to the disclosed method, an occupant producing a weight reading in a range that includes tightly cinched child seats is distinguished from a child seat by detecting the variation in the sensed weight during vehicle movement. The occupant is characterized as a child or small adult if the variation exceeds a threshold, whereas the occupant is characterized as a child seat if the variation is below the threshold, as a tightly cinched seat belt severely restricts variance. In fact, vehicle movement itself can be inferred from the weight variance, if desired. The method also detects a frequency of the sensed weight as a correlative factor for distinguishing between a child seat and a child or small adult. However, testing has revealed that this method cannot reliably identify the presence of a cinched child seat when the vehicle is being operated on a rough road surface. This is because the rough road increases the range of weight variance for a cinched child seat to the point that it partially overlaps the normally expected range of weight variance for a child or small adult. Accordingly, what is desired is an occupant characterization method that can reliably identify the presence of a cinched child seat, even when the vehicle is being operated on a rough road.

SUMMARY OF THE INVENTION

The present invention is directed to an improved weight-based occupant characterization method that reliably distinguishes between a child or small adult and a tightly cinched child seat, based on a variance in the sensed occupant weight and a variance in the vehicle acceleration. According to the invention, the weight variance and acceleration variance are used to determine a relative or normalized variance that compensates for the effects of operating the vehicle on a rough road surface. The occupant is characterized as a cinched child seat if the normalized variance is below a first threshold for a predetermined interval, and as a normally restrained child or small adult if the normalized variation exceeds a second threshold for a predetermined interval.

DESCRIPTION OF THE PREFERRED EMBODIMENT

The present invention is disclosed in the context of a restraint system for an occupant of a vehicle passenger seat 10, where the occupant weight is detected based on the fluid pressure in a seat cushion bladder 12. In general, however, the present invention applies to other types of weight-based occupant detection systems as well, such as systems that sense the strain in a seat frame element, or systems that include a network of pressure sensitive cells distributed over the seating area.

Figure 1:
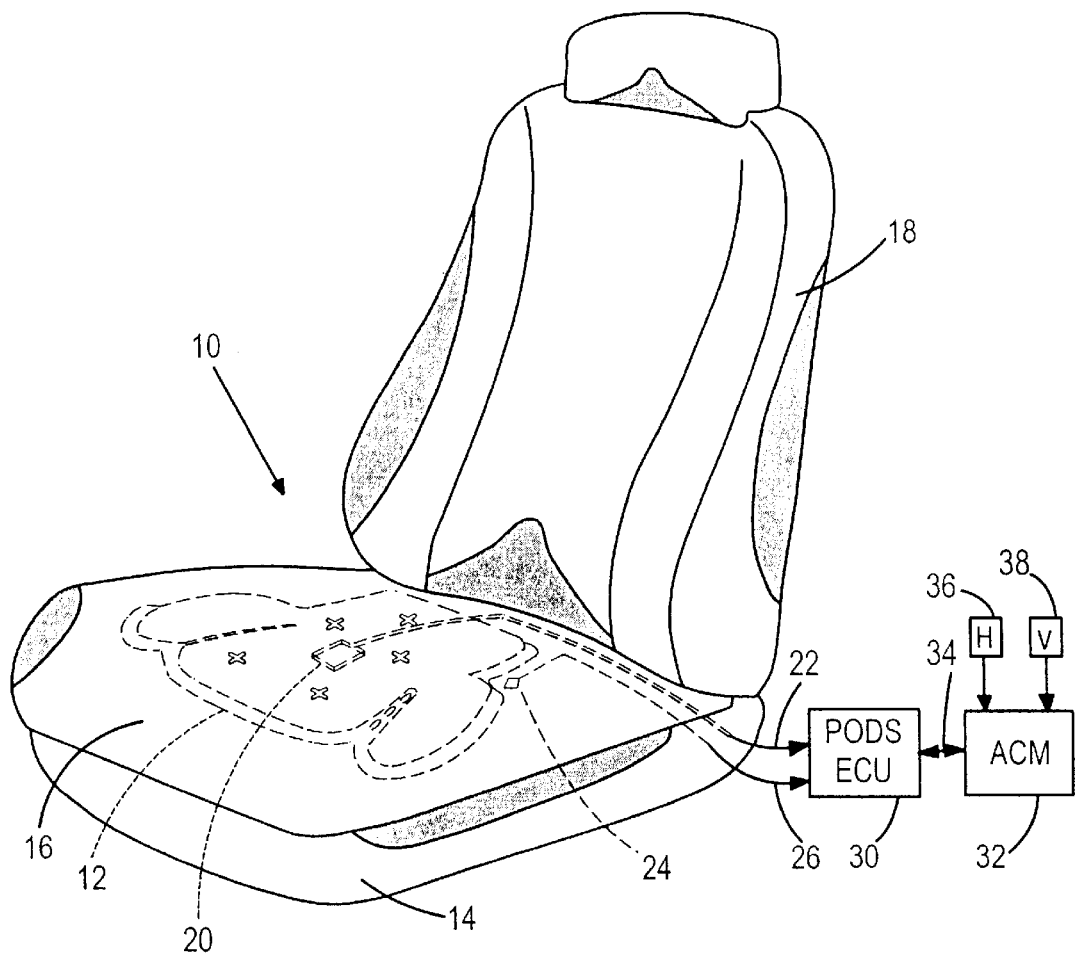
FIG. 1 is a system diagram illustrating a passenger seat of a vehicle equipped with a fluid-filled bladder, a passenger occupant detection electronic control unit (PODS ECU), an airbag control module (ACM), and vehicle acceleration sensors for characterizing an occupant of the seat according to this invention.

Referring to FIG. 1, the vehicle seat 10 is supported on a frame 14, and includes foam cushions 16 and 18 on the seat bottom and back. The bladder 12 is disposed in or under the foam cushion 16 substantially parallel with the central seating surface, and preferably contains a fluid such as silicone which is non-corrosive, and not subject to freezing at extreme ambient temperatures. The bladder 12 is coupled to a pressure sensor 20, which provides an electrical output signal on line 22 indicative of the fluid pressure in the bladder 12. A temperature sensor 24 located in proximity to the bladder 12 provides an electrical output signal on line 26 indicative of the bladder and foam temperature. The sensor 24 can be provided as a separate sensor as indicated in FIG. 1, or may be integrated with the pressure sensor 20.

The electrical pressure and temperature signals on lines 22 and 26 are provided as inputs to a passenger occupant detection system electronic control unit (PODS ECU) 30, which in turn, is coupled to a airbag control module (ACM) 32 via bidirectional communication bus 34. The ACM 32 may be conventional in nature, and operates to deploy one or more airbags or other restraint devices (not shown) for vehicle occupant protection based on the vertical and/or horizontal acceleration signals obtained from vertical acceleration sensor (V) 38 and horizontal acceleration sensor (H) 36, and occupant characterization data obtained from PODS ECU 30. In general, ACM 32 deploys the restraints if the acceleration signals indicate the occurrence of a severe crash, unless the PODS ECU 30 indicates that the seat 12 is occupied by an infant or child seat. Of course, other more sophisticated controls are also possible, such as controlling the deployment force of the restraint devices based on the occupant characterization data provided by PODS ECU 30.

In the illustrated embodiment, the primary function of PODS ECU 30 is to estimate occupant weight based on the pressure and temperature signal provided by the sensors 20 and 24, as described for example in the U.S. Pat. No. 5,987,370 to Murphy et al. (which is incorporated by reference herein), and to reliably distinguish between a child or small adult and a child seat placed on the seat 10 and cinched down with a seat belt (not shown). Essentially, the relationship between occupant weight and the sensed pressure is empirically determined at a variety of temperatures, and the data is used to construct either a mathematical model or a multi-dimensional look-up table of occupant weight as a function of temperature and sensed pressure, with the model or table programmed into PODS ECU 30 and used to determine the occupant weight. However, weight estimation alone is inadequate to reliably distinguish between a child or small adult and a cinched down child seat, since both can produce similar pressure signal magnitudes.

According to the present invention, the difficulty in distinguishing between a child or small adult and a cinched down child seat is resolved by detecting the variation in the pressure signal PS and the vertical acceleration signal ACCEL. Testing has revealed that there is a significant difference in pressure signal variation, depending on the degree of restraint of the occupant. When the occupant is a normally restrained small adult or child, the pressure signal exhibits a high degree of variation during movement of the vehicle, even if the occupant is resting or asleep. When the occupant is a tightly cinched child seat, on the other hand, the pressure signal variation is much lower since a tightly cinched seat belt severely restricts variation of the pressure in bladder 12. However, if the vehicle is being operated on a rough road, the occupants may experience significant jostling, and the range of pressure signal variation for a tightly cinched child seat increases to the point that it is no longer distinguishable from the normally expected pressure signal range for a small adult or child sitting on the seat 10. Thus, it may be impossible to establish pressure variance thresholds that reliably distinguish between a tightly cinched child seat and a normally restrained occupant under all driving conditions. This issue is addressed, according to this invention, by normalizing the measured pressure signal variation based on detected vehicle acceleration, and comparing the normalized pressure signal variation to predetermined thresholds for purposes of distinguishing between a tightly cinched child seat and a normally restrained occupant. If the normalized variance of the sensed weight is less than a first threshold for a predetermined interval, the occupant is characterized as a child seat, whereas if the normalized variance exceeds a second threshold for a predetermined interval, the occupant is characterized as a child or small adult. In the illustrated embodiment, the weight variance is normalized by calculating a ratio of the average pressure variation to the average vertical acceleration variation. The ratio will have a value of approximately one for a tightly cinched child seat, and a value of 3–5 or higher for a child or small adult sitting on the seat 10.

Figure 2:
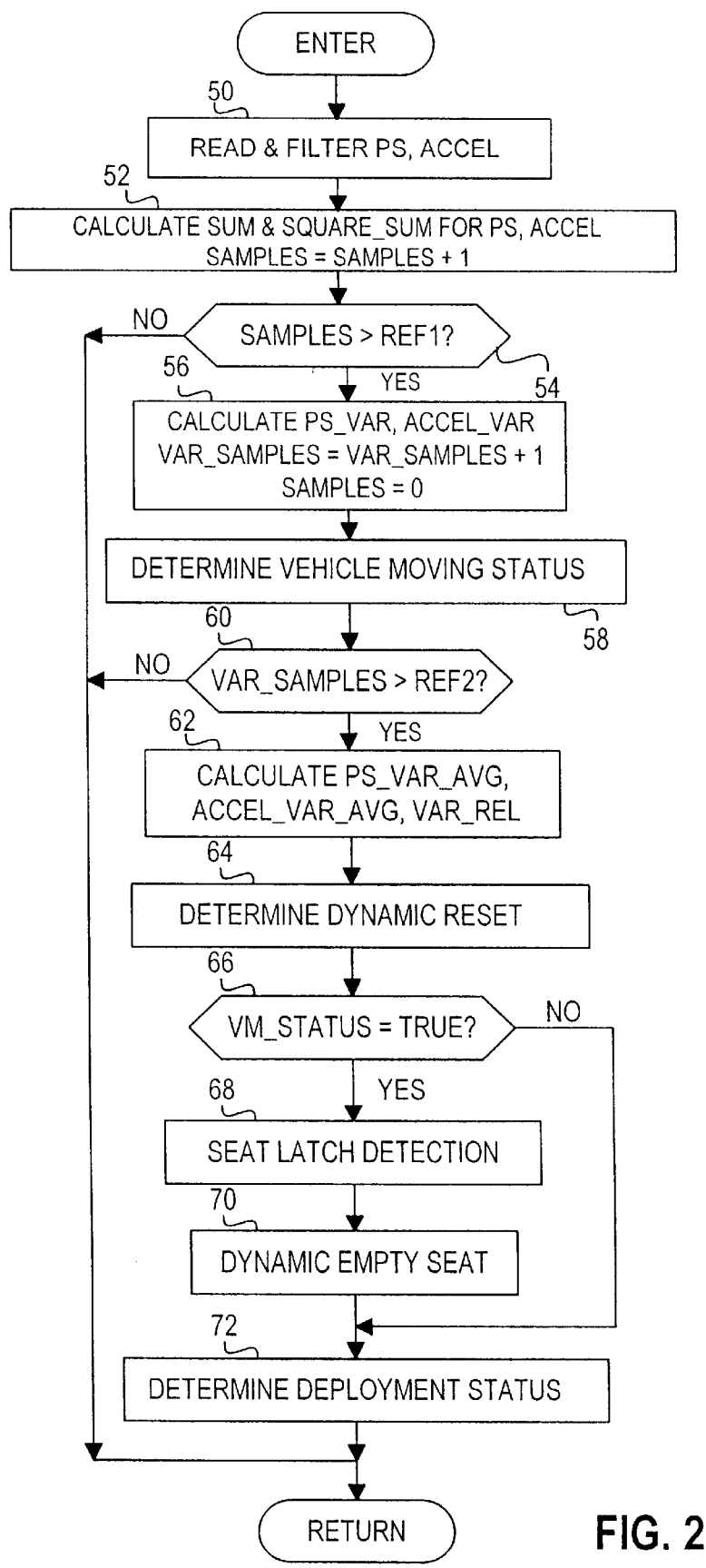
FIGS. 2, 3 and 4 depict a flow diagram representative of a software routine executed by the PODS ECU of FIG. 1 in carrying out the method of this invention.
Figure 3:
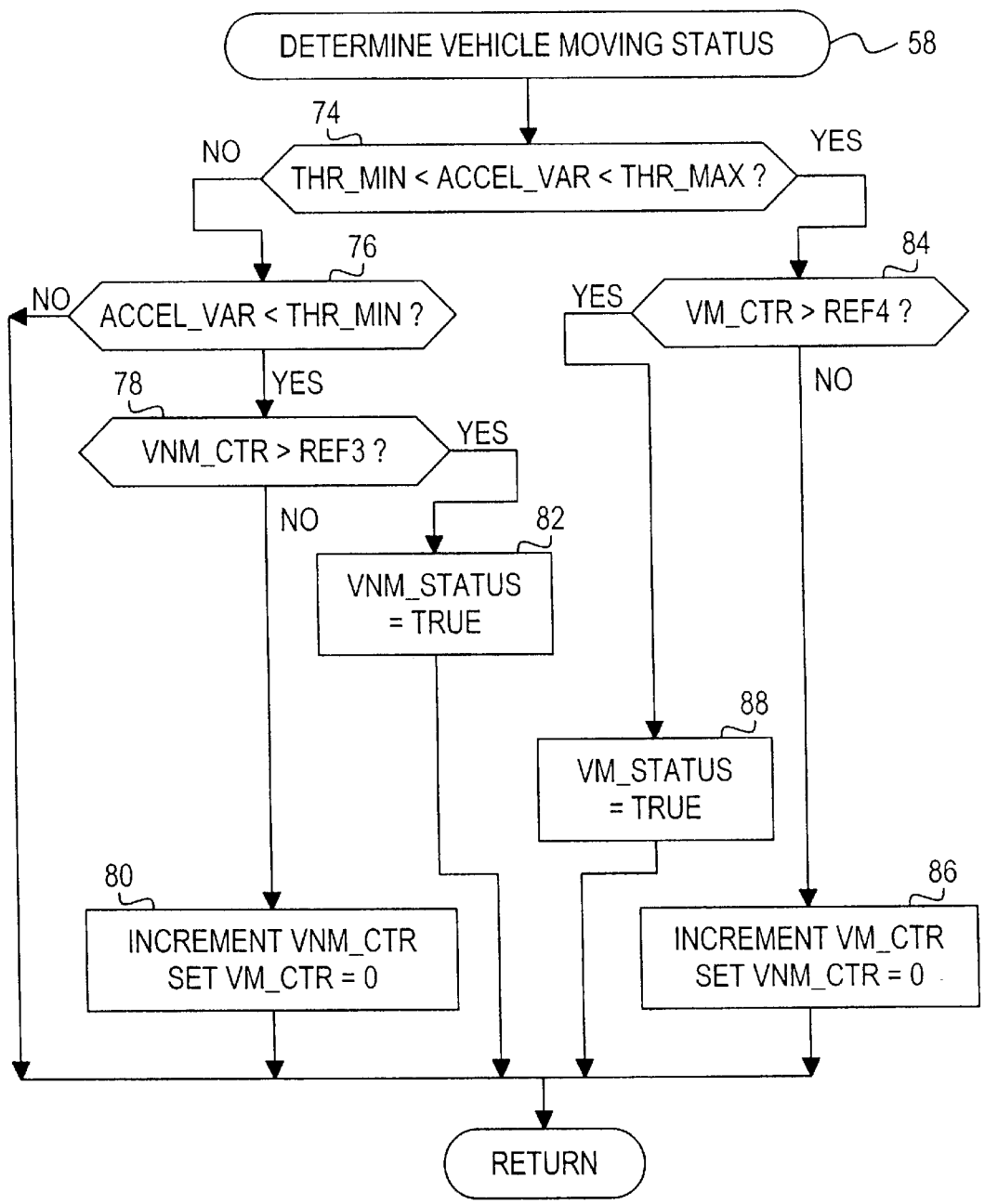
Figure 4:
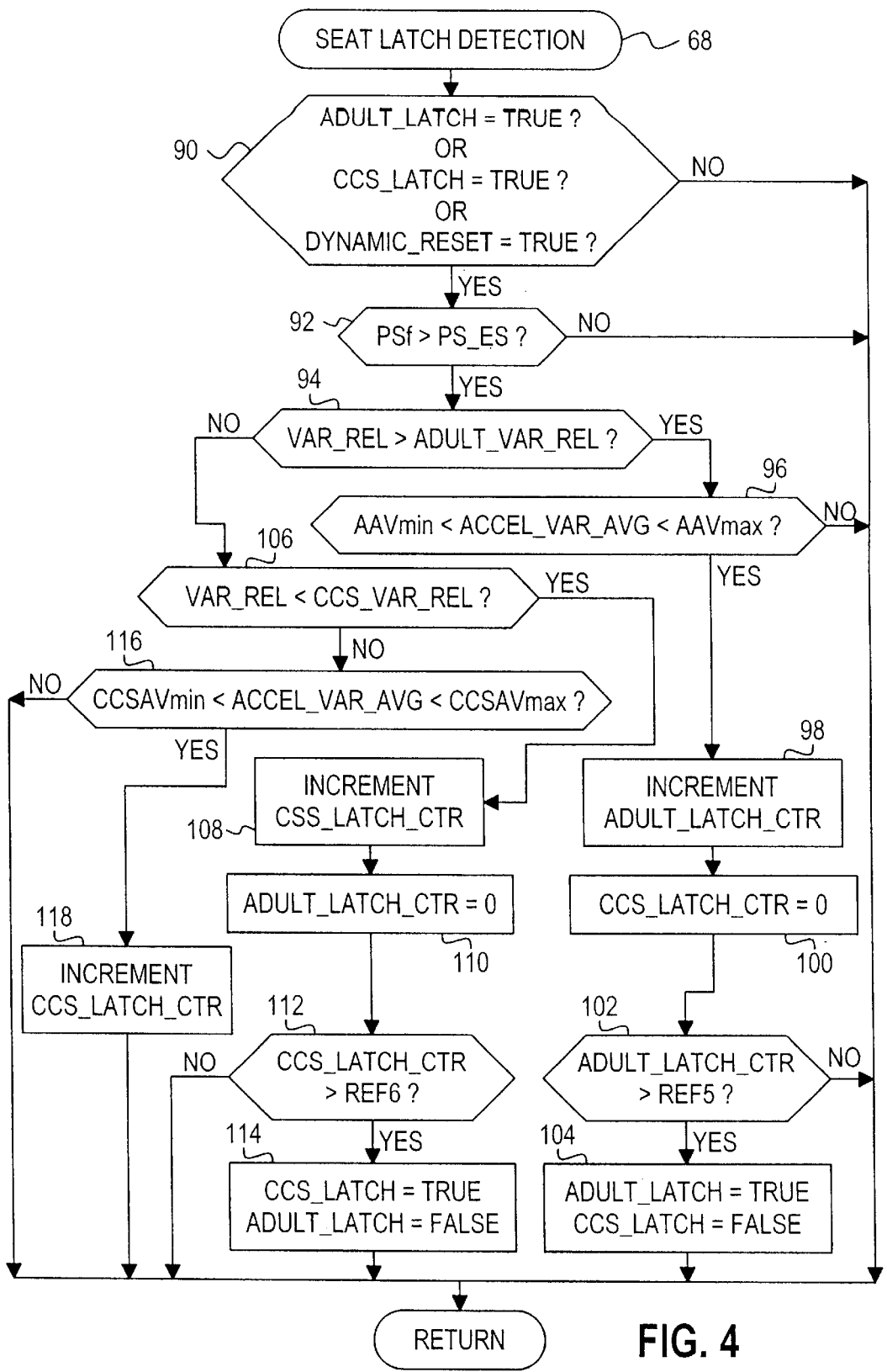

The flow diagrams of FIGS. 2–4 illustrate a software routine periodically executed by the PODS ECU 30 for carrying out this invention. The flow diagram of FIG. 2 represents a main or executive routine, whereas the flow diagrams of FIGS. 3–4 detail various steps of the main routine. At the initiation of each period of vehicle operation—that is, prior to executing the routine of FIGS. 2–4—the PODS ECU 30 executes an initialization routine for initializing various registers, parameters and flags to zero or some other default setting. In the case of this invention, for example, the latch flags (CCS_LATCH, ADULT_LATCH) and status flags (VM_STATUS, VNM_STATUS) may be initialized to a default setting, or to the settings determined in the previous ignition cycle. Also, the various counters variables (SAMPLES, VAR_SAMPLES, VNM_CTR, VM_CTR, CCS LATCH_CTR, ADULT_LATCH_CTR) are reset to zero, as are the calculated variance terms ($SUM_{ps}$, $SUM_{accel}$, $SQUARE\_SUM_{ps}$, $SQUARE\_SUM_{accel}$, PS_VAR, ACCEL_VAR, PS_VAR_AVG, ACCEL_VAR_AVG, VAR_REL). A similar initialization also occurs in the event of a dynamic reset, discussed below in reference to block 64 of FIG. 2.

Referring particularly to FIG. 2, the blocks 50 and 52 are first executed to sample, low-pass filter and sum the pressure sensor output signal PS and the vertical acceleration sensor output signal ACCEL. Additionally, the block 52 calculates a sum of squares (SQUARE_SUM) for each of the signals, and increments a sample counter variable SAMPLES. As indicated at block 54, the remainder of the routine is skipped until a predetermined number (REF1) of samples has been acquired and used to update SUM and SQUARE_SUM. The term SUM is a summation of the respective samples, and the term SQUARE_SUM is a summation of the squares of the respective samples, divided by REF1, as shown below:

$$SUM_{ps} = SUM_{ps} + PS_f$$

$$SUM_{accel} = SUM_{accel} + ACCEL_f$$

$$SQUARE\_SUM_{ps} = [SQUARE\_SUM_{ps} + PS_f^2]/REF1$$

$$SQUARE\_SUM_{accel} = [SQUARE\_SUM_{accel} + ACCEL_f^2]/REF1$$

where the subscript "ps" designates a pressure sensor variable, the subscript "accel" designates an acceleration sensor variable, and the subscript "f" designates a filtered sample. After REF1 samples have been acquired, the block 56 resets SAMPLES to zero, increments the variance counter variable VAR_SAMPLES, and calculates the variance PS_VAR of the pressure sensor signal and the variance ACCEL_VAR of the acceleration sensor signal, as follows:

$$PS\_VAR = SQUARE\_SUM_{ps} - (SUM_{ps}/REF1)^2$$

$$ACCEL\_VAR = SQUARE\_SUM_{accel} - (SUM_{accel}/REF1)^2$$

Also, the block 58 is executed to update the status flags used to determine if the vehicle is moving. As described below in reference to FIG. 3, the status flags are updated based on ACCEL_VAR; alternatively, vehicle movement may be determined directly if a vehicle speed input or equivalent is available.

As indicated at block 60, the remainder of the routine is skipped and the blocks 50–58 re-executed until a predetermined number (REF2) of variance calculations have been made. When VAR_SAMPLES exceeds REF2, the block 62 averages the respective calculated values of PS_VAR and ACCEL_VAR to form PS_VAR_AVG and ACCEL_VAR_AVG. Additionally, the block 62 computes the relative variance VAR_REL according to the ratio (PS_VAR_AVG/ACCEL_VAR_AVG). The term VAR_REL essentially represents the variance of the pressure sensor signal, normalized to compensate for the influence of the vertical acceleration of the vehicle, due to driving over a rough road surface, for example.

The block 64 is then executed to determine if the occupant characterization routine should be dynamically reset, as mentioned above. This involves, for example, determining if there is a fault in the seat belt system, if the seat belt for seat 10 becomes unbuckled, if the seat 10 becomes unoccupied, or if there is a large shift in the filtered pressure signal. In these cases, a DYNAMIC_RESET flag is set, indicating that the parameters, counters and flags used in the routine are to be re-initialized. When re-initialization occurs, the DYNAMIC_RESET flag is also reset.

Block 66 determines if the vehicle is moving based on the value of the vehicle moving status flag VM_STATUS. If the vehicle is moving, the blocks 68 and 70 are executed to characterize the occupancy of seat 10. Block 68, described in detail below in reference to FIG. 4, compares the relative variance VAR_REL to various thresholds to determine if the seat 10 is occupied by a child/small adult or a cinched child seat, and the block 70 updates an empty seat pressure signal value PR_ES if it is determined that the seat 10 is unoccupied. Detection of a child/small adult is indicated when ADULT_STATUS is TRUE, whereas detection of a cinched child seat is indicated when CCS_STATUS is TRUE. And finally, the block 72 is executed to determine whether DEPLOYMENT_STATUS should be set to ENABLE or DISABLE, based on the vehicle moving and occupant status flags. For example, DEPLOYMENT_STATUS may be set to DISABLE if the car is not moving (VNM_STATUS=TRUE), or if the car is moving (VM_STATUS=TRUE) and CCS_LATCH is TRUE. On the other hand, DEPLOYMENT_STATUS may be set to ENABLE if the car is moving (VM_STATUS=TRUE) and ADULT_LATCH is TRUE. Other variations are also possible.

Referring to FIG. 3, vehicle movement is detected by comparing ACCEL_VAR to a range of variance defined by minimum and maximum thresholds THR_MIN and THR_MAX. If ACCEL_VAR is below THR_MIN, as determined by blocks 74 and 76, vehicle movement is not indicated; if the vehicle not moving counter VNM_CTR is less than a reference value REF3, as determined at block 78, the block 80 increments VNM_CTR and sets the vehicle moving counter VM_CTR to zero. Once VNM_CTR exceeds REF3, the block 82 sets the vehicle not moving status flag VNM_STATUS to TRUE. If ACCEL_VAR is within the range defined by THR_MIN and THR_MAX, as determined by block 74, vehicle movement is indicated; if the vehicle moving counter VM_CTR is less than a reference value REF4, as determined at block 84, the block 86 increments VM_CTR and sets the vehicle not moving counter VNM_CTR to zero. Once VM_CTR exceeds REF4, the block 88 sets the vehicle moving status flag VM_STATUS to TRUE. Finally, if ACCEL_VAR is greater than THR_MAX, as determined by blocks 74 and 76, the blocks 78–88 are skipped, and the counters and status flags are not updated. Alternatively, the vehicle moving status may be determined directly if a vehicle speed input is available, as mentioned above.

Referring to FIG. 4, the seat latch detection block 68 initially determines if the ADULT_LATCH, CCS_LATCH or DYNAMIC_RESET flags are TRUE. If so, or if block 92 determines that the filtered pressure sensor signal $PS_f$ is less than or equal to the empty seat value PS_ES mentioned above, the remainder of the routine is skipped. Otherwise, the block 94 is executed to determine if VAR_REL is greater than a threshold value ADULT_VAR_REL indicative of a small adult or child; ADULT_VAR_REL may have a value of 2.5, for example. If block 94 is answered in the affirmative, the block 96 is executed to determine if ACCEL_VAR_AVG is within a range of expected variation for a small adult or child, as defined by the calibrated minimum and maximum terms AAV min, AAV max. If not, the routine is exited; if so, the blocks 98, 100, 102 and 104 are executed to increment ADULT_LATCH_CTR, to reset the CCS_LATCH_CTR to zero, and once ADULT_LATCH_CTR reaches a threshold REF5, to set ADULT_LATCH to TRUE and CCS_LATCH to FALSE. If block 94 is answered in the negative, block 106 determines if VAR_REL is below a threshold value CCS_VAR_REL indicative of a cinched child seat; CCS_VAR_REL may have a value of 1.5, for example. If VAR_REL is less than CCS_VAR_REL, the blocks 108, 110, 112 and 114 are executed to increment CCS_LATCH_CTR, to reset ADULT_LATCH_CTR to zero, and once CCS_LATCH_CTR exceeds a reference REF6, to set CCS_LATCH to TRUE and ADULT_LATCH to FALSE. If VAR_REL falls between CCS_VAR_REL and ADULT_VAR_REL, as determined by blocks 94 and 106, a cinched child seat is likely, and the block 116 is executed to determine if ACCEL_VAR_AVG is within a range of expected variation for a cinched child seat, as defined by the calibrated minimum and maximum terms CCSAV min, CCSAV max. If not, the routine is exited; if so, the block 118 is executed to increment CCS_LATCH_CTR, but block 114 cannot be executed to set CCS_LATCH to TRUE until VAR_REL falls below CCS_VAR_REL.

In summary, the method of this invention incorporates an inexpensive and reliable technique for characterizing a vehicle occupant for purposes of inhibiting or enabling air bag deployment, and particularly for distinguishing a cinched child seat from an occupant of similar apparent weight. While illustrated in reference to the illustrated embodiment, it is expected that various modifications will occur to persons skilled in the art. For example, this invention is not limited to pressure based bladder systems, and may be applied equally as well to other occupant detection systems, as indicated above. Also, horizontal acceleration may be used in order to compensate for detected seat pressure variations due to longitudinal acceleration or deceleration of the vehicle. Accordingly, it should be understood that occupant characterization methods incorporating these and other modifications may fall within the scope of this invention, which is defined by the appended claims.

What is claimed is:

1. A method of distinguishing between a normally restrained occupant and a cinched child seat in an occupant detection system of a vehicle having an output signal responsive to weight applied to a vehicle seat, the method comprising the steps of:

computing a variance of the output signal and a running average of such variance;

measuring a vertical acceleration of the vehicle;

normalizing the averaged variance based on the measured vertical acceleration;

determining that a cinched child seat is present if the vehicle is moving and the normalized average variance is below a first predefined threshold indicative of a cinched child seat; and determining that a normally restrained occupant is present if the vehicle is moving and the normalized average variance is above a second predefined threshold indicative of a normally restrained child or small adult.

2. The method of claim 1, including the steps of:

measuring a horizontal acceleration of the vehicle; and normalizing the averaged variance based on the measured horizontal acceleration.

3. The method of claim 1, including the steps of:

computing a variance of the measured vertical acceleration and a running average of such variance; and forming a ratio of the averaged output signal variance and the averaged vertical acceleration variance to form said normalized average variance.

4. The method of claim 3, including the step of:

determining that a normally restrained occupant is present if the normalized average variance is above said second predefined threshold for at least a predefined time and the averaged vertical acceleration variance is within a range expected for a normally restrained child or small adult.

5. The method of claim 3, including the steps of:

accumulating an elapsed time when (1) the normalized average variance is below said first predefined threshold, or (2) the normalized average variance is between said first and second thresholds and the averaged vertical acceleration variance is within a range expected for a cinched child seat; and determining that a cinched child seat is present if the normalized average variance is below said first predefined threshold and said elapsed time exceeds a predefined time.

6. The method of claim 1, including the step of:

determining that a normally restrained occupant is present if the normalized average variance is above said second predefined threshold for at least a predefined time.

7. The method of claim 1, including the step of:

determining that a cinched child seat is present if the normalized average variance is below said first predefined threshold for at least a predefined time.

8. The method of claim 1, including the steps of:

computing a variance of the measured vertical acceleration; and determining that the vehicle is moving if the variance of the measured vertical acceleration is within a range expected during vehicle movement for at least a predefined time.

* * * * *